F. G. SPEAR.
EGG BEATER.
APPLICATION FILED MAR. 7, 1913.
1,101,347.
Patented June 23, 1914.
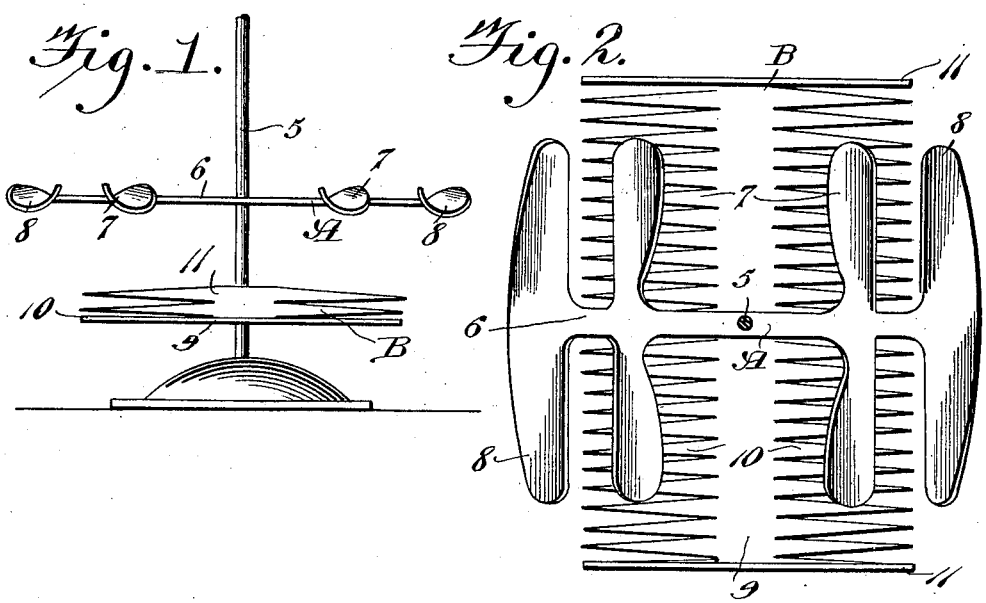
Witnesses
Inventor
Fannie G. Spear
By Victor J. Evans
Attorney

UNITED STATES PATENT OFFICE.

FANNIE G. SPEAR, OF CHICAGO, ILLINOIS.

EGG-BEATER.

1,101,347. Specification of Letters Patent. Patented June 23, 1914.

Application filed March 7, 1913. Serial No. 752,745.

*To all whom it may concern:*

Be it known that I, FANNIE G. SPEAR, a citizen of the United States, residing at Chicago, in the county of Cook and State of Illinois, have invented new and useful Improvements in Egg-Beaters, of which the following is a specification.

The invention relates to egg beaters and more particularly to the class of agitator or beater wings for egg beater devices.

The primary object of the invention is the provision of agitators wherein the wings or arms thereof will constantly act upon the material or eggs to be beaten, so as to thoroughly whip the same for the lightening thereof.

Another object of the invention is the provision of an agitator of this character which is extremely simple in construction, thoroughly reliable and efficient in operation, and inexpensive in manufacture.

With these and other objects in view the invention consists in the construction, combination and arrangement of parts as will hereinafter be more fully described, illustrated in the accompanying drawing and pointed out in the claim hereunto appended.

In the drawing: Figure 1, is a fragmentary side view of an agitator constructed in accordance with the invention. Fig. 2, is a top plan view thereof.

Similar reference characters indicate corresponding parts throughout the several views in the drawings.

Referring to the drawing by numerals, the agitator comprises rotary shaft 5, which is commonly called the beater shaft and may be operated in any desirable manner. On this shaft 5, are fixed upper and lower beaters A and B respectively, which are hereinafter more fully described. The beater A, comprises a sheet metal body 6, although the same may be made from a strand of relative stiff wire, and is formed with opposed inner and outer wings or blades 7 and 8, respectively, the wings or blades 7 being curved, while the wings or blades 8 are outwardly bowed, so as to act on the egg or other material to beat the same. The lower beater B comprises a solid intermediate portion 9 and opposed outer rows of spaced teeth 10, the intermediate portion at the ends thereof being upturned at 11, and the rows of teeth serve to cut the material or egg and throw the same upward, while the upper beater tends to throw it downwardly. The beaters A and B are centrally secured to the shaft 5 in any desirable manner.

From the foregoing it is thought that the constructions and manner of operation of the invention will be clearly understood and therefore a more extended explanation has been omitted.

It is to be understood that changes, variations and modifications may be made in the invention, such as come properly within the scope of the appended claim, without departing from the spirit of said invention or sacrificing any of its advantages.

What is claimed is:

A beater of the class described comprising a rotary member, spaced upper and lower beaters mounted on the member, the said upper beater being formed with spaced inner and outer curved wings extending laterally in opposite directions, the lowermost beater being formed with a solid intermediate portion and opposed outer rows of spaced teeth, the intermediate portion being up-turned.

In testimony whereof I affix my signature in presence of two witnesses.

MRS. FANNIE G. SPEAR.

Witnesses:
  MABEL DORIS OPASHI,
  MABEL NORTON.

Copies of this patent may be obtained for five cents each, by addressing the "Commissioner of Patents, Washington, D. C."